United States Patent
Raghothaman et al.

(10) Patent No.: US 11,901,995 B2
(45) Date of Patent: Feb. 13, 2024

(54) PRECODER FEEDBACK INFORMATION SCHEME FOR DOWNLINK COLOCATED MULTIPLE INPUT MULTIPLE OUTPUT (MIMO) OR DISTRIBUTED MIMO

(71) Applicant: CommScope Technologies LLC, Hickory, NC (US)

(72) Inventors: Balaji B Raghothaman, Chester Springs, PA (US); Stuart D. Sandberg, Acton, MA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/743,910

(22) Filed: May 13, 2022

(65) Prior Publication Data
US 2022/0368398 A1    Nov. 17, 2022

Related U.S. Application Data

(60) Provisional application No. 63/188,907, filed on May 14, 2021.

(51) Int. Cl.
*H04B 7/02*    (2018.01)
*H04B 7/06*    (2006.01)
*H04B 7/0456*    (2017.01)

(52) U.S. Cl.
CPC ......... *H04B 7/0639* (2013.01); *H04B 7/0456* (2013.01); *H04B 7/0626* (2013.01)

(58) Field of Classification Search
CPC .. H04B 7/0639; H04B 7/0456; H04B 7/0626; H04B 7/024
(Continued)

(56) References Cited

U.S. PATENT DOCUMENTS

2009/0041148 A1* 2/2009 Li .................. H04L 1/0017
                                                    375/267
2016/0043791 A1    2/2016 Nam
(Continued)

OTHER PUBLICATIONS

3GPP, ETSI TS 138 521-4 V16.7.0 (Apr. 2021), "5G; NR; User Equipment (UE) conformance specification; Radio transmission and Reception; Part 4: Performance (3GPP TS 38.521-4 V16.7.0, Release 16)", Apr. 8, 2021, pp. 1 through 531.
(Continued)

*Primary Examiner* — Helene E Tayong
(74) *Attorney, Agent, or Firm* — Fogg & Powers LLC

(57) ABSTRACT

One embodiment is directed to determining a composite precoder for transmitting to a UE using a group of one or more of the radio units by doing the following: for each of a plurality of subsets of the radio units, transmitting separate reference signals from the different antennas of only the radio units included in that subset; receiving subset-specific preferred precoder index reports from the UE for at least each individual radio unit included in the group of one or more of the radio units; determining the composite precoder for the UE using the subset-specific preferred precoder index reports from the UE for at least the one or more radio units included in the group; and using the composite precoder for transmitting to the UE using the one or more radio units included in the group. In some embodiments, each of the subsets includes less than all of the radio units.

32 Claims, 2 Drawing Sheets

Figure 1:
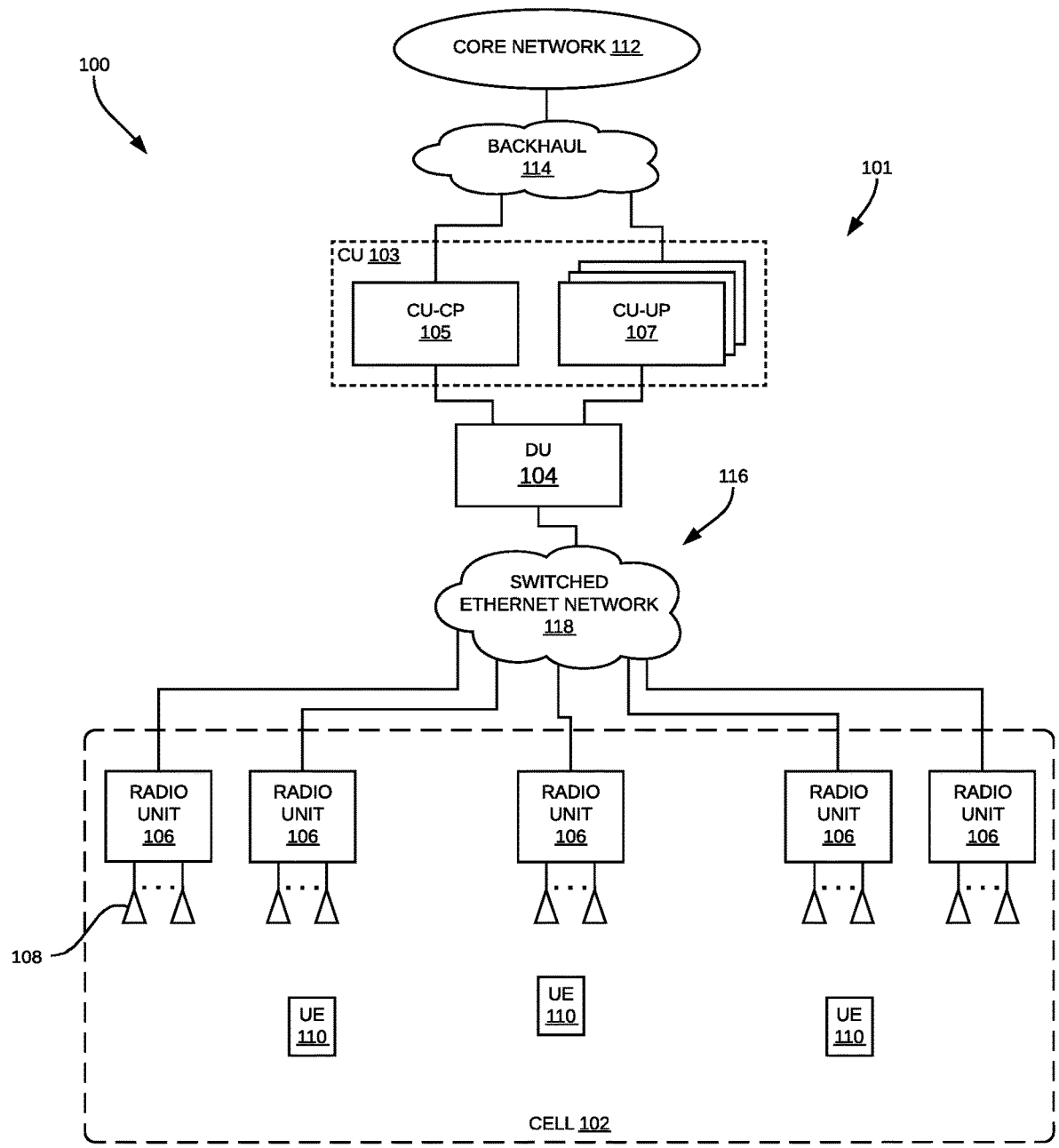

(58) Field of Classification Search
USPC .......................................................... 375/267
See application file for complete search history.

(56) References Cited

U.S. PATENT DOCUMENTS

| | | |
|---|---|---|
| 2016/0365957 A1 | 12/2016 | Lee et al. |
| 2019/0028158 A1 | 1/2019 | Park et al. |
| 2019/0280834 A1 | 9/2019 | Joseph et al. |
| 2020/0045585 A1* | 2/2020 | Huang .................. H04W 28/10 |
| 2020/0162117 A1 | 5/2020 | Sandberg et al. |

OTHER PUBLICATIONS

International Searching Authority, "International Search Report and Written Opinion from PCT Application No. PCT/US2022/029260 dated Aug. 31, 2022", from Foreign Counterpart to U.S. Appl. No. 17/743,910, pp. 1 through 12, Published in: KR.

* cited by examiner

PRECODER FEEDBACK INFORMATION SCHEME FOR DOWNLINK COLOCATED MULTIPLE INPUT MULTIPLE OUTPUT (MIMO) OR DISTRIBUTED MIMO

CROSS-REFERENCE TO RELATED APPLICATIONS

This application claims the benefit of U.S. Provisional Patent Application Ser. No. 63/188,907 filed on May 14, 2021, entitled "PRECODER FEEDBACK INFORMATION SCHEME FOR DOWNLINK COLOCATED MULTIPLE INPUT MULTIPLE OUTPUT (MIMO) OR DISTRIBUTED MIMO", the entirety of which is incorporated herein by reference.

BACKGROUND

A centralized or cloud radio access network (C-RAN) is one way to implement base station functionality. Typically, for each cell implemented by a C-RAN, a single baseband unit (BBU) interacts with multiple radio units (also referred to here as "radio units," "remote points," or "RPs") in order to provide wireless service to various items of user equipment (UEs). The multiple radio units are typically located remotely from each other (that is, the multiple radio units are not co-located).

The multiple, non-collocated radio units can be used in various configurations to provide better single-user and multi-user spectral efficiency. One approach makes use of multiple input, multiple output (MIMO) techniques. MIMO refers to techniques for wirelessly transmitting and receiving more than one data stream over the same radio channel by exploiting multipath propagation.

With 4th Generation (4G) Long Term Evolution (LTE) and 5th Generation (5G) New Radio (NR), for a given transmission to a UE, one or more data streams (also referred to as "layers") are inputs to a precoding operation that generates the respective data for each of multiple logical antenna ports. The precoding operation uses a precoder, which is generally a M×N matrix used with N layers and M antenna ports. 4G LTE and 5G NR both support multiple transmission modes, some of which support MIMO. The particular number of layers used depends on the transmission mode being used for transmission to the UE.

One way to implement MIMO (as well as the other supported transmission modes) uses antenna elements that are co-located together in the same antenna array and that are coupled to the same radio unit. Each of the co-located antenna elements is used to transmit data for one of the antenna ports (more specifically, is used to transmit a respective radio frequency (RF) signal generated from the data for one of the antenna ports). This approach is referred to here as "co-located MIMO" or "C-MIMO" (though it should be understood that this C-MIMO approach can be used with transmission modes that do not employ MIMO).

The C-MIMO approach can be implemented in a C-RAN to transmit the data for the multiple antenna ports from the antenna array of a single radio unit or simulcast the data for the multiple antenna ports from the antenna arrays of multiple radio units. With this approach, each radio unit of the C-RAN that is used for transmitting to the associated UE transmits data for all of the antenna ports. Data for each of the multiple antenna ports is used to generate a respective RF signal that is transmitted from a different one of the co-located antenna elements coupled to each transmitting radio unit. With this simulcast C-MIMO approach, data for the same antenna ports (generated by the same precoding operation) are transmitted from all of the multiple transmitting radio units. For example, if a transmission mode that uses four antenna ports is used to transmit to a UE using multiple radio units that each include four antenna elements, data for each of the four different antenna ports would be transmitted from a different one of the four antenna elements at each of the multiple transmitting radio units, regardless of the number of transmitting radio units used.

In another way to implement MIMO (as well as the other supported transmission modes) using a C-RAN, not all of the antenna elements used to transmit data for the different antenna ports are co-located together at the same radio unit. Instead, the antenna elements coupled to a set of multiple radio units are used to form a single composite antenna array to transmit the data for the multiple antenna ports. Multiple sets of radio units can be used, where each of the sets of multiple radio units forms a different composite antenna array. This approach is referred to here as "distributed MIMO" or "D-MIMO" (though it should be understood that this D-MIMO approach can be used with transmission modes that do not employ MIMO). For example, if D-MIMO is used with a transmission mode that uses eight antenna ports and is implemented using a C-RAN where the antenna array coupled to each radio unit includes four antenna elements, a set of two radio units can be used for the transmission, where data for each of the eight different antenna ports is transmitted from only a single antenna element coupled to a single one of the two radio units in that set. In this example, multiple sets of two radio units can be used, where each of the sets of two radio units forms a different composite antenna array.

One challenge in implementing MIMO (and the other supported transmission modes) using a C-RAN is determining which precoding matrix to use for each UE.

Which precoding matrix is used for each UE is traditionally determined using UE feedback or reciprocity. When UE feedback is used, reference signals are transmitted from the same set of antennas ultimately used for the intended transmission. The UE measures the reference signals and feeds information back to the serving base station. This feedback information can take the form of a preferred precoder index (that is, a precoding matrix indicator (PMI)). To determine the preferred precoder index, the UE selects a preferred precoder index from a predetermined set of precoding matrices (known as the "codebook") based on the reference signal measurements. The selected preferred precoder index is communicated to the serving base station. The feedback information can also take the form of channel coefficients. In this case, the UE directly feeds back to the serving base station the measured channel coefficients in quantized form, enabling the serving base station to determine the downlink precoding matrix for the UE.

When reciprocity is used to determine the downlink precoding matrix, the serving base station measures the channel during an uplink transmission (for example, during a Sounding Reference Signal (SRS) transmission) and uses the measurements to compute the downlink precoding matrix. This technique is suitable for use with a time division duplexing (TDD) configuration, but not with a frequency division duplexing (FDD) configuration due to the difference in carrier frequencies used for the uplink and downlink.

These traditional techniques for determining the precoding matrix can be used with the C-MIMO and D-MIMO approaches described above. However, these traditional techniques can be resource-intensive when used to do so. For example, if the traditional UE feedback techniques are used for C-MIMO, separate reference signals are typically simulcasted from the different antennas of the antenna array using all of the one or more transmitting radio units for that UE at the same time. That is, a first reference signal is simulcasted from the first antenna of all of the one or more transmitting radio units, a second reference signal is simulcasted from the second antenna of all of the one or more transmitting radio units used, and so on for each of the antennas in the antenna array. This can be done in a suboptimal manner in a 4G C-RAN system using cell-specific reference signals (CS-RS). In a 5G C-RAN system, this can be done using appropriately scheduled channel state information reference signals (CSI-RS).

If the traditional UE feedback techniques are used for D-MIMO, separate reference signals are transmitted from the different antennas in the composite antenna array formed using the multiple transmitting radio units used for transmitting to a given UE. Doing this in practice can be difficult. Each UE may have a different location and a different set of prospective transmitting radio units to be used for D-MIMO. This can make determining a reference signal transmission schedule challenging, since the system cannot cater to all possible combinations, while at the same time maintaining a reasonable periodicity for each UE for the sake of averaging and sensitivity to the mobility of the UE.

Another issue with using traditional techniques for determining which precoding matrix to use is that they do not take into account possible interference scenarios that may exist during actual transmissions. Instead, measurements of the relevant reference signals are made at times that differ from when the actual transmissions occur. The interference scenarios that exist when the reference signal measurements are made may differ from the interference scenarios that exist during actual transmission. These interference scenarios can include interference from neighboring radio units, interference from neighboring sectors, as well as multi-user MIMO (MU-MIMO) transmissions from the same sector.

SUMMARY

One embodiment is directed to a system comprising a distributed unit and a plurality of radio units to wirelessly transmit and receive radio frequency signals to and from user equipment using a wireless interface. Each of the radio units is associated with a respective set of antennas. The distributed unit is communicatively coupled to the plurality of radio units. The distributed unit is configured to do the following in order to determine a composite precoder for transmitting to a UE using a group of one or more of the radio units: for each of a plurality of subsets of the radio units, transmit separate reference signals from the different antennas of only the radio units included in that subset; receive subset-specific preferred precoder index reports from the UE for at least each subset that includes one or more radio units included in the group; determine the composite precoder for the UE using at least some of the subset-specific preferred precoder index reports received from the UE; and use the composite precoder for transmitting to the UE using the one or more radio units included in the group. Each of the subsets includes less than all of the radio units.

Another embodiment is directed to a method of determining a composite precoder for transmitting to user equipment (UE) using a group of one or more of radio units of a radio access system. The radio access system comprises a distributed unit and a plurality of radio units to wirelessly transmit and receive radio frequency signals to and from the UE using a wireless interface. Each of the radio units is associated with a respective set of antennas. The distributed unit is communicatively coupled to the plurality of radio units, the method comprising: for each of a plurality of subsets of the radio units, transmitting separate reference signals from the different antennas of only the radio units included in that subset; receiving subset-specific preferred precoder index reports from the UE for at least each subset that includes one or more radio units included in the group; determining the composite precoder for the UE using at least some of the subset-specific preferred precoder index reports received from the UE; and using the composite precoder for transmitting to the UE using the one or more radio units included in the group. Each of the subsets includes less than all of the radio units.

Other embodiments are disclosed.

The details of various embodiments are set forth in the accompanying drawings and the description below. Other features and advantages will become apparent from the description, the drawings, and the claims.

DRAWINGS

FIG. 1 is a block diagram illustrating one exemplary embodiment of a radio access network (RAN) system 100.

Figure 2:
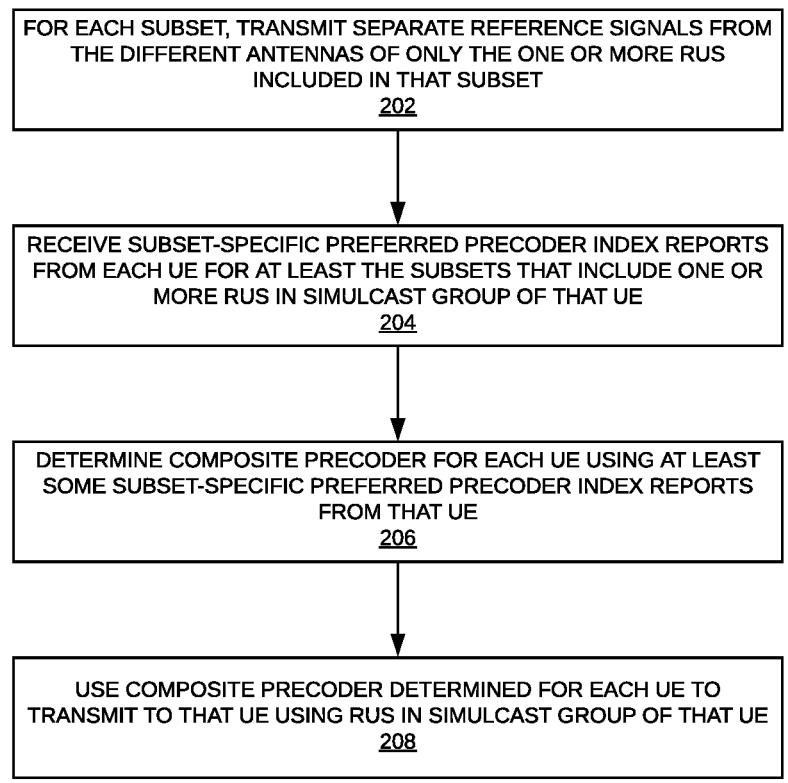

FIG. 2 comprises a high-level flowchart illustrating one exemplary embodiment of a method 200 of determining a composite precoder to be used to transmit to a UE.

Like reference numbers and designations in the various drawings indicate like elements.

DETAILED DESCRIPTION

FIG. 1 is a block diagram illustrating one exemplary embodiment of a radio access network (RAN) system 100 in which the precoder determination techniques described below can be used. The RAN system 100 shown in FIG. 1 implements at least one base station 101 to serve at least one cell (or sector) 102. The RAN system 100 can also be referred to here as a "base station" or "base station system."

In the exemplary embodiment shown in FIG. 1, the system 100 is implemented at least in part using a centralized or cloud RAN (C-RAN) architecture in which each base station 101 is partitioned into one or more central unit entities (CUs) 103, one or more distributed unit entities (DUs) 104, and one or more radio units (RUs) 106 (also referred to here as "radio points" (RPs), "remote units," "remote radio heads" (RRHs), or "access points" (APs)). The system 100 is also referred to here as a "C-RAN system" 100. In this example, each CU 103 implements Layer 3 and non-time critical Layer 2 functions for the base station 101. In the embodiment shown in FIG. 1, each CU 103 is further partitioned into one or more control-plane entities 105 and one or more user-plane entities 107 that handle the control-plane and user-plane processing of the CU 103, respectively. Each such control-plane CU entity 105 is also referred to as a "CU-CP" 105, and each such user-plane CU entity 107 is also referred to as a "CU-UP" 107. Also, in such a configuration, each DU 104 is configured to implement the time critical Layer 2 functions and at least some of the Layer 1 functions for the base station 101. In this example, each RU 106 is configured to implement the physical layer functions for the base station 101 that are not implemented in the DU 104 as well as the RF interface.

The RAN system 100 can be implemented in accordance with one or more public standards and specifications. For example, the RAN system 100 can be implemented using a RAN architecture and/or RAN fronthaul interfaces defined by the O-RAN Alliance in order to provide 4G LTE and/or 5G NR wireless service. In such an O-RAN example, the DU 104 and RUs 106 can be implemented as O-RAN distributed units and O-RAN remote units, respectively, in accordance with the O-RAN specifications. The RAN system 100 can be implemented in other ways.

Each RU 106 includes or is coupled to one or more antennas 108 via which downlink RF signals are radiated to various items of user equipment (UE) 110 and via which uplink RF signals transmitted by UEs 110 are received.

In one configuration (used, for example, in indoor deployments), each RU 106 is co-located with its respective set of antennas 108 and is remotely located from the DU 104 serving it as well as at least one of the other RUs 106. In another configuration (used, for example, in outdoor deployments), the respective sets of antennas 108 for multiple RUs 106 are deployed together in a sectorized configuration (for example, mounted at the top of a tower or mast), with each set of antennas 108 serving a different sector. In such a sectorized configuration, the RUs 106 need not be co-located with the respective sets of antennas 108 and, for example, can be co-located together (for example, at the base of the tower or mast structure) and, possibly, co-located with its serving DUs 104. Other configurations can be used.

Although FIG. 1 (and the description set forth below more generally) is described in the context of a 5G embodiment in which each logical base station entity 101 is partitioned into a CU 103, a DU 104, and RUs 106 and, for at least some of the physical channels, some physical-layer processing is performed in each DUs 106 with the remaining physical-layer processing being performed in the RUs 106, it is to be understood that the techniques described here can be used with other wireless interfaces (for example, 4G LTE) and with other ways of implementing a base station entity (for example, using a conventional baseband band unit (BBU)/remote radio head (RRH) architecture). Accordingly, references to a CU, DU, or RU in this description and associated figures can also be considered to refer more generally to any entity (including, for example, any "base station" or "RAN" entity) implementing any of the functions or features described here as being implemented by a CU, DU, or RU.

The system 100 is coupled to a core network 112 of the associated wireless network operator over an appropriate backhaul 114 (such as the Internet). Also, each DU 104 is communicatively coupled to the RUs 106 served by it using a fronthaul 116. Each of the DU 104 and RUs 106 include one or more network interfaces (not shown) in order to enable the DU 104 and RUs 106 to communicate over the fronthaul 116.

In one implementation, the fronthaul 116 that communicatively couples the DU 104 to the RUs 106 is implemented using a switched ETHERNET network 118. In such an implementation, each DU 104 and RUs 106 includes one or more ETHERNET interfaces for communicating over the switched ETHERNET network 118 used for the fronthaul 116. However, it is to be understood that the fronthaul between each DU 104 and the RUs 106 served by it can be implemented in other ways.

Each CU 103, DU 104, and RU 106 (and the functionality described here as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components. Each CU 103, DU 104, RU 106, and the system 100 more generally, can be implemented in other ways.

In the exemplary embodiment described here in connection with FIG. 1, a "signature vector" (SV) is determined for each UE 110. The signature vector is determined based on received power measurements made at each of the RUs 106. When a UE 110 makes initial LTE or 5G NR Physical Random Access Channel (PRACH) transmissions to access a cell 102 served by the C-RAN 100, one or more RUs 106 will receive those initial PRACH transmissions. Each RU 106 is configured to detect uplink PRACH transmissions that it has received (that is, each RU 106 is configured to detect when UEs 110 are attempting to access the associated cell 102) and make received power measurements for those PRACH transmissions. A signal reception metric indicative of the received power level of the received PRACH transmission as received by that RU 106 from that UE 110 is determined based on the received power measurements. The signal reception metrics that are determined based on the PRACH transmissions are also referred to here as "PRACH metrics." The initial version of the signature vector for each UE 110 is created based on the PRACH metrics for that UE 110. This initial version of the signature vector fora UE 110 is also referred to here as the "PRACH signature vector" for that UE 110.

The signature vector for each UE 110 is updated over the course of that UE's connection to the cell 102 based on Sounding Reference Signals (SRS) transmitted by each UE 110. Each RU 106 is configured to make received power measurements for the SRS transmissions from each UE 110. A signal reception metric indicative of the power level of the SRS transmissions received by the RUs 106 from each UE 110 based on the received power measurements is determined. The signal reception metrics that are determined based on the SRS transmissions are also referred to here as "SRS metrics." The updated versions of the signature vector for each UE 110 are created based on the SRS metrics for that UE 110. Each of these updated versions of the signature vector for a UE 110 is also referred to here as the "functional signature vector" for that UE 110.

The signature vector for a UE 110 can be used to determine the set of RUs 106 used to transmit to the UE 110. The set of RUs 106 used to transmit to a UE 110 is also referred to here as the "simulcast group" for that UE 110. The signature vector for a UE 110 can be used to determine which RUs 106 are included in the simulcast group for that UE 110. In general, which RUs 106 are included in the simulcast group for a UE 110 can be determined by selecting those RUs 106 having corresponding signal reception metrics that are above a predetermined threshold and/or that satisfy some other condition. A preliminary simulcast group can be determined fora UE 110 and then expanded to include additional RUs 106 or shrunk to include fewer RUs 106 based on other considerations.

In some embodiments, the C-RAN 100 is configured to support frequency reuse. As used here, "downlink frequency reuse" refers to situations where separate downlink data intended for different UEs 110 is simultaneously transmitted to the UEs 110 using the same physical resource blocks (PRBs) for the same cell 102. For those PRBs where downlink frequency reuse is used, each of the multiple reuse UEs 110 is served by a different subset of the RUs 106 serving the cell 102, where no RU 106 is used to serve more than one UE 110 for those reused PRBs. Typically, these situations arise where the reuse UEs 110 are sufficiently physically separated from each other so that the co-channel interference resulting from the different downlink transmissions is sufficiently low (that is, where this is sufficient RF isolation).

FIG. 2 comprises a high-level flowchart illustrating one exemplary embodiment of a method 200 of determining a composite precoder to be used to transmit to a UE. The embodiment of method 200 shown in FIG. 2 is described here as being implemented using the C-RAN 100 of FIG. 1 (though it is to be understood that other embodiments can be implemented in other ways). Method 200 is suitable for use, for example, where C-MIMO or D-MIMO is used to transmit to a UE 110 using multiple radio units 106.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

In the exemplary embodiment described here in connection with FIGS. 1 and 2, for each base station 101, a plurality of subsets of the RUs 106 used to serve that given base station 101 are defined. In some embodiments, at least some of the subsets include less than all of the RUs 106 used to serve that base station 101. In some embodiments, all of the subsets include less than all of the RUs 106 used to serve that base station 101.

In one example, all of the subsets include only a single RU 106. This example is also referred to here as the "single-RU subset" example. In other examples, one or more of the subsets includes more than one RU 106. In some examples, each RU 106 is included in only a single subset (for example, in the single-RU subset example, each RU 106 is included in only the particular subset that includes that RU 106). In other examples, one or more of the RUs 106 are included in more than one of the subsets. Other examples are possible.

Method 200 comprises, for each subset, transmitting separate reference signals from the different antennas 108 of only the one or more RUs 106 included in that subset (block 202).

With the traditional UE feedback techniques used for C-MIMO described above, for the set of one or more radio units 106 used for transmitting to each UE 110, separate reference signals are simulcasted from the different antennas of the antenna array of all of the radio units 106 at the same time. That is, a first reference signal is simulcasted from the first antenna of all of the radio units 106, a second reference signal is simulcasted from the second antenna of all of the radio units 106, and so on for each of the antennas in the antenna array. In contrast to this traditional C-MIMO approach, with block 202 of method 200, separate reference signals are transmitted from the different antennas of only those RUs 106 that are in the subset. For example, in the single-RU subset example where each of the subsets includes only a single RU 106, this involves, for each RU 106, transmitting separate reference signals from the different antennas 108 of only that RU 106—that is, separate reference signals are transmitted from the different antennas of only a single RU 106 at a time. This is done for each radio unit 106 in the C-RAN 100.

In one implementation, the processing associated with block 202 is implemented using channel state information reference signals (CSI-RSs). For example, in the single-RU subset example, the DU 104 can be configured to schedule each single RU 106 to individually transmit separate CSI-RSs from the different antennas of each single RU 106.

Method 200 further comprises receiving subset-specific preferred precoder index reports from each UE 110 for (at least) each subset that includes one or more RUs 106 that are included in the simulcast group for that UE 110 (block 204). Each subset-specific preferred precoder index report is made based on the subset-specific reference signals transmitted from the various antennas of the associated RU 106.

In this exemplary embodiment, the associated precoder referred to by each precoder index report comprises a precoding matrix. In this embodiment, each UE 110 can be instructed to report a separate precoding matrix indicator (PMI) for each subset that includes a RU 106 that is included in the simulcast group for that UE 110. That is, the reference signals are scheduled and transmitted, and the UEs 110 report PMI, on a subset-by-subset basis. In the single-RU subset example, the reference signals are scheduled and transmitted, and the UEs 110 report PMI, on a RU-by-RU basis. In one implementation, the processing associated with block 204 is implemented using channel state information reference signals (CSI-RSs). For example, the DU 104 can be configured to schedule each UE 110 to make subset-specific PMI reports for each subset that includes a RU 106 that is included in the simulcast group for that UE 110, where each subset-specific PMI report is made based on the subset-specific CSI-RSs transmitted from the various antennas of the associated one or more RUs 106.

Method 200 further comprises, for each UE 110, determining a composite precoder for that UE 110 using at least some of the subset-specific preferred precoder index reports made by that UE 110 (block 206) and using the determined composite precoder for transmitting to the UE 110 using the RUs 106 in the simulcast group of that UE 110 (block 208). In one implementation, the distributed unit 104 is configured to determine the composite precoder for each UE 110 and the distributed unit 104 and the RUs 106 are configured to use the respective determined composite precoder for transmitting to each UE 110 using the RUs 106 in the simulcast group of that UE 110. In this exemplary embodiment, the composite precoder comprises a composite precoding matrix.

Other information can also be used in the determination of the composite precoder for each UE 110. In one example, the "other information" includes information about the pathloss differentials between the UE 110 and each of the RUs 106 in the simulcast group. This pathloss differential information can be determined, for example, in the same way that the signature vector is determined. In one implementation of the single-RU subset example, the distributed unit 104 is configured to use this pathloss differential information to assign a respective weight to each separate precoder indicated by the RU-specific PMI reports made by the UE 110 for each RU 106 in the simulcast group of that UE 110. In such an implementation, the distributed unit 104 is configured to combine the separate precoders indicated by the RU-specific PMI reports made by the UE 110 for the one or more RUs 106 in the simulcast group of that UE 110 using the assigned weights in order to determine a composite precoder for transmitting to that UE 110 (for example, by using the assigned weights to combine the separate precoding matrices on an element-by-element basis).

In another implementation of the single-RU subset example, the "other information" used in determining the composite precoder for each UE 110 (in addition to the RU-specific PMI reports made by that UE 110) includes the RU-specific PMIs reported by any other UEs 110 that are going to be scheduled to be transmitted to on the same physical resource blocks (PRBs) as that UE 110 (for example, using MU-MIMO or using isolation-based downlink frequency reuse). In one implementation, where multiple UEs 110 are scheduled to be transmitted to on the same PRBs, the separate precoder indicated by the RU-specific PMI reports made by each UE 110 for each RU 106 can be used as a stand-in for the channel coefficients themselves while applying the interference suppression techniques described in United States Patent Publication US20200162117A1 (U.S. patent application Ser. No. 16/685,922, filed Nov. 15, 2019, and titled "INTERFERENCE SUPPRESSION FOR MULTI-USER MULTIPLE-INPUT-MULTIPLE-OUTPUT (MU-MIMO) PRE-CODERS USING COORDINATION AMONG ONE OR MORE RADIO POINTS"). The distributed unit 104 can be configured to do this.

The composite precoder that is determined for each UE 110 can be used to transmit to that UE 110 using the radio units included in that UE's simulcast group using the appropriate transmission mode (for example, using co-located MIMO (C-MIMO) transmission and/or distributed MIMO (D-MIMO) transmission as described above).

By using the technique described above in connection with FIG. 2, an appropriate composite precoder can be determined for transmitting to each UE 110 using multiple radio units 106 (for example, using the C-MIMO or D-MIMO techniques described above) in a way that is resource efficient.

Other embodiments can be implemented in other ways.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system comprising: a distributed unit; and a plurality of radio units to wirelessly transmit and receive radio frequency signals to and from user equipment using a wireless interface, each of the radio units associated with a respective set of antennas; wherein the distributed unit is communicatively coupled to the plurality of radio units; wherein the distributed unit is configured to do the following in order to determine a composite precoder for transmitting to a UE using a group of one or more of the radio units: for each of a plurality of subsets of the radio units, transmit separate reference signals from the different antennas of only the radio units included in that subset; receive subset-specific preferred precoder index reports from the UE for at least each subset that includes one or more radio units included in the group; determine the composite precoder for the UE using at least some of the subset-specific preferred precoder index reports received from the UE; and use the composite precoder for transmitting to the UE using the one or more radio units included in the group; and wherein each of the subsets includes less than all of the radio units.

Example 2 includes the system of claim 1, wherein the reference signals comprise channel state information reference signals (CSI-RSs).

Example 3 includes the system of claim 1, wherein the precoder comprises a precoding matrix.

Example 4 includes the system of claim 1, wherein the preferred precoder index reports comprise precoding matrix indicator (PMI) reports.

Example 5 includes the system of claim 1, wherein the distributed unit is configured to use other information in addition to said at least some of the subset-specific preferred precoder index reports received from the UE in order to determine the composite precoder for the UE.

Example 6 includes the system of claim 1, wherein at least one of the plurality of subsets comprises multiple radio units.

Example 7 includes the system of claim 1, wherein at least one of the plurality of subsets comprises a single radio unit.

Example 8 includes the system of claim 1, wherein each of the plurality of subsets includes only a respective single radio unit, wherein each of the respective subset-specific preferred precoder index reports comprises a respective radio-unit-specific preferred precoder index reports from the UE.

Example 9 includes the system of claim 8, wherein the distributed unit is configured to use other information in addition to at least some radio-unit-specific preferred precoder index reports received from the UE in order to determine the composite precoder for the UE; and wherein the other information comprises information about pathloss differentials between the UE and each of the one or more radio units in the group.

Example 10 includes the system of claim 9, wherein the distributed unit is configured to use the pathloss differential information to assign respective weights to the respective precoders indicated by said at least some radio-unit-specific preferred precoder index reports received from the UE; and wherein the distributed unit is configured to combine the respective precoders indicated by said at least some radio-unit-specific preferred precoder index reports received from the UE using the weights assigned thereto in order to determine the composite precoder for the UE.

Example 11 includes the system of claim 8, where the UE for which the composite precoder is determined comprises a first UE; wherein the composite precoder is used for transmitting to the first UE using a set of physical resource blocks (PRBs); and wherein the other information comprises information about at least some radio-unit-specific preferred precoder index reports received from any other UEs the distributed unit is scheduling for transmission to on at least some of the PRBs included in the set used for transmitting to the first UE.

Example 12 includes the system of claim 11, wherein the distributed unit is configured to use said at least some radio-unit-specific preferred precoder index reports received from the first UE and said at least some radio-unit-specific preferred precoder index reports received from said other UEs in order to determine the composite precoder for the first UE.

Example 13 includes the system of claim 12, wherein the distributed unit is configured to use said at least some radio-unit-specific preferred precoder index reports received from the first UE and said at least some radio-unit-specific preferred precoder index reports received from said other UEs in order to determine the composite precoder for the first UE by applying interference suppression techniques.

Example 14 includes the system of claim 13, wherein the distributed unit is configured to use said at least some radio-unit-specific preferred precoder index reports received from the first UE and said at least some radio-unit-specific preferred precoder index reports received from said other UEs in order to determine the composite precoder for the first UE by applying interference suppression techniques that use the respective precoders indicated by said at least some radio-unit-specific preferred precoder index reports received from the first UE and said at least some radio-unit-specific preferred precoder index reports received from said other UEs.

Example 15 includes the system of claim 1, wherein the composite precoder is used for transmitting to the UE using the one or more radio units included in the group using multiple-input, multiple-output (MIMO) transmission.

Example 16 includes the system of claim 15, wherein the composite precoder is used for transmitting to the UE using the one or more radio units included in the group using at least one of: co-located MIMO (C-MIMO) transmission and distributed MIMO (D-MIMO) transmission.

Example 17 includes a method of determining a composite precoder for transmitting to user equipment (UE) using a group of one or more of radio units of a radio access system, the radio access system comprising a distributed unit and a plurality of radio units to wirelessly transmit and receive radio frequency signals to and from the UE using a wireless interface, each of the radio units associated with a respective set of antennas and wherein the distributed unit is communicatively coupled to the plurality of radio units, the method comprising: for each of a plurality of subsets of the radio units, transmitting separate reference signals from the different antennas of only the radio units included in that subset; receiving subset-specific preferred precoder index reports from the UE for at least each subset that includes one or more radio units included in the group; determining the composite precoder for the UE using at least some of the subset-specific preferred precoder index reports received from the UE; and using the composite precoder for transmitting to the UE using the one or more radio units included in the group; and wherein each of the subsets includes less than all of the radio units.

Example 18 includes the method of claim 17, wherein the reference signals comprise channel state information reference signals (CSI-RSs).

Example 19 includes the method of claim 17, wherein the precoder comprises a precoding matrix.

Example 20 includes the method of claim 17, wherein the preferred precoder index reports comprise precoding matrix indicator (PMI) reports.

Example 21 includes the method of claim 17, wherein determining the composite precoder for the UE comprises determining the composite precoder for the UE using at least some of the subset-specific preferred precoder index reports received from the UE and other information.

Example 22 includes the method of claim 17, wherein at least one of the plurality of subsets comprises multiple radio units.

Example 23 includes the system of claim 17, wherein at least one of the plurality of subsets comprises a single radio unit.

Example 24 includes the system of claim 17, wherein all of the plurality of subsets include only a respective single radio unit, wherein each of the respective subset-specific preferred precoder index reports comprises a respective radio-unit-specific preferred precoder index reports from the UE.

Example 25 includes the method of claim 24, wherein determining the composite precoder for the UE comprises determining the composite precoder for the UE using at least some radio-unit-specific preferred precoder index reports received from the UE and other information; and wherein the other information comprises information about pathloss differentials between the UE and each of the one or more radio units in the group.

Example 26 includes the method of claim 25, wherein determining the composite precoder for the UE using said at least some radio-unit-specific preferred precoder index reports received from the UE and the other information comprises: using the pathloss differential information to assign respective weights to the respective precoders indicated by said at least some radio-unit-specific preferred precoder index reports received from the UE; and combining the respective precoders indicated by said at least some radio-unit-specific preferred precoder index reports received from the UE using the weights assigned thereto in order to determine the composite precoder for the UE.

Example 27 includes the method of claim 24, where the UE for which the composite precoder is determined comprises a first UE; wherein the composite precoder is used for transmitting to the first UE using a set of physical resource blocks (PRBs); and wherein the other information comprises information about at least some radio-unit-specific preferred precoder index reports received from any other UEs the distributed unit is scheduling for transmission to on at least some of the PRBs included in the set used for transmitting to the first UE.

Example 28 includes the method of claim 27, wherein determining the composite precoder for the UE using said at least some radio-unit-specific preferred precoder index reports received from the UE and the other information comprises: using said at least some radio-unit-specific preferred precoder index reports received from the first UE and at least some radio-unit-specific preferred precoder index reports received from said other UEs in order to determine the composite precoder for the first UE.

Example 29 includes the method of claim 28, wherein using said at least some radio-unit-specific preferred precoder index reports received from the first UE and said at least some radio-unit-specific preferred precoder index reports received from said other UEs in order to determine the composite precoder for the first UE comprises: applying interference suppression techniques using said at least some radio-unit-specific preferred precoder index reports received from the first UE and said at least some radio-unit-specific preferred precoder index reports received from said other UEs.

Example 30 includes the method of claim 29, wherein applying the interference suppression techniques comprises: applying the interference suppression techniques using the respective precoders indicated by said at least some radio-unit-specific preferred precoder index reports received from the first UE and said at least some radio-unit-specific preferred precoder index reports received from said other UEs.

Example 31 includes the method of claim 17, wherein the composite precoder is used for transmitting to the UE using the one or more radio units included in the group using multiple-input, multiple-output (MIMO) transmission.

Example 32 includes the method of claim 17, wherein the composite precoder is used for transmitting to the UE using the one or more radio units included in the group using at least one of: co-located MIMO (C-MIMO) transmission and distributed MIMO (D-MIMO) transmission.

What is claimed is:

1. A system comprising:
   a distributed unit; and
   a plurality of radio units to wirelessly transmit and receive radio frequency signals to and from user equipment using a wireless interface, each of the radio units associated with a respective set of antennas;
   wherein the distributed unit is communicatively coupled to the plurality of radio units;
   wherein the distributed unit is configured to do the following in order to determine a composite precoder for transmitting to a UE using a group of one or more of the radio units:
      for each of a plurality of subsets of the radio units, transmit separate reference signals from the different antennas of only the radio units included in that subset;
      receive subset-specific preferred precoder index reports from the UE for at least each subset that includes one or more radio units included in the group;
      determine the composite precoder for the UE using at least some of the subset-specific preferred precoder index reports received from the UE; and
      use the composite precoder for transmitting to the UE using the one or more radio units included in the group; and
   wherein each of the subsets includes less than all of the radio units.

2. The system of claim 1, wherein the reference signals comprise channel state information reference signals (CSI-RS s).

3. The system of claim 1, wherein the precoder comprises a precoding matrix.

4. The system of claim 1, wherein the preferred precoder index reports comprise precoding matrix indicator (PMI) reports.

5. The system of claim 1, wherein the distributed unit is configured to use other information in addition to said at least some of the subset-specific preferred precoder index reports received from the UE in order to determine the composite precoder for the UE.

6. The system of claim 1, wherein at least one of the plurality of subsets comprises multiple radio units.

7. The system of claim 1, wherein at least one of the plurality of subsets comprises a single radio unit.

8. The system of claim 1, wherein each of the plurality of subsets includes only a respective single radio unit, wherein each of the respective subset-specific preferred precoder index reports comprises a respective radio-unit-specific preferred precoder index reports from the UE.

9. The system of claim 8, wherein the distributed unit is configured to use other information in addition to at least some radio-unit-specific preferred precoder index reports received from the UE in order to determine the composite precoder for the UE; and
   wherein the other information comprises information about pathloss differentials between the UE and each of the one or more radio units in the group.

10. The system of claim 9, wherein the distributed unit is configured to use the pathloss differential information to assign respective weights to the respective precoders indicated by said at least some radio-unit-specific preferred precoder index reports received from the UE; and
    wherein the distributed unit is configured to combine the respective precoders indicated by said at least some radio-unit-specific preferred precoder index reports received from the UE using the weights assigned thereto in order to determine the composite precoder for the UE.

11. The system of claim 8, wherein the distributed unit is configured to use other information in addition to at least some radio-unit-specific preferred precoder index reports received from the UE in order to determine the composite precoder for the UE;
    wherein the UE for which the composite precoder is determined comprises a first UE;
    wherein the composite precoder is used for transmitting to the first UE using a set of physical resource blocks (PRBs); and
    wherein the other information comprises information about at least some radio-unit-specific preferred precoder index reports received from any other UEs the distributed unit is scheduling for transmission to on at least some of the PRBs included in the set used for transmitting to the first UE.

12. The system of claim 11, wherein the distributed unit is configured to use said at least some radio-unit-specific preferred precoder index reports received from the first UE and said at least some radio-unit-specific preferred precoder index reports received from said other UEs in order to determine the composite precoder for the first UE.

13. The system of claim 12, wherein the distributed unit is configured to use said at least some radio-unit-specific preferred precoder index reports received from the first UE and said at least some radio-unit-specific preferred precoder index reports received from said other UEs in order to determine the composite precoder for the first UE by applying interference suppression techniques.

14. The system of claim 13, wherein the distributed unit is configured to use said at least some radio-unit-specific preferred precoder index reports received from the first UE and said at least some radio-unit-specific preferred precoder index reports received from said other UEs in order to determine the composite precoder for the first UE by applying interference suppression techniques that use the respective precoders indicated by said at least some radio-unit-specific preferred precoder index reports received from the first UE and said at least some radio-unit-specific preferred precoder index reports received from said other UEs.

15. The system of claim 1, wherein the composite precoder is used for transmitting to the UE using the one or more radio units included in the group using multiple-input, multiple-output (MIMO) transmission.

16. The system of claim 15, wherein the composite precoder is used for transmitting to the UE using the one or more radio units included in the group using at least one of: co-located MIMO (C-MIMO) transmission and distributed MIMO (D-MIMO) transmission.

17. A method of determining a composite precoder for transmitting to user equipment (UE) using a group of one or more of radio units of a radio access system, the radio access system comprising a distributed unit and a plurality of radio units to wirelessly transmit and receive radio frequency signals to and from the UE using a wireless interface, each of the radio units associated with a respective set of antennas and wherein the distributed unit is communicatively coupled to the plurality of radio units, the method comprising:

for each of a plurality of subsets of the radio units, transmitting separate reference signals from the different antennas of only the radio units included in that subset;

receiving subset-specific preferred precoder index reports from the UE for at least each subset that includes one or more radio units included in the group;

determining the composite precoder for the UE using at least some of the subset-specific preferred precoder index reports received from the UE; and using the composite precoder for transmitting to the UE using the one or more radio units included in the group; and wherein each of the subsets includes less than all of the radio units.

18. The method of claim 17, wherein the reference signals comprise channel state information reference signals (CSI-RSs).

19. The method of claim 17, wherein the precoder comprises a precoding matrix.

20. The method of claim 17, wherein the preferred precoder index reports comprise precoding matrix indicator (PMI) reports.

21. The method of claim 17, wherein determining the composite precoder for the UE comprises determining the composite precoder for the UE using said at least some of the subset-specific preferred precoder index reports received from the UE and other information.

22. The method of claim 17, wherein at least one of the plurality of subsets comprises multiple radio units.

23. The method of claim 17, wherein at least one of the plurality of subsets comprises a single radio unit.

24. The method of claim 17, wherein all of the plurality of subsets include only a respective single radio unit, wherein each of the respective subset-specific preferred precoder index reports comprises a respective radio-unit-specific preferred precoder index reports from the UE.

25. The method of claim 24, wherein determining the composite precoder for the UE comprises determining the composite precoder for the UE using at least some radio-unit-specific preferred precoder index reports received from the UE and other information; and wherein the other information comprises information about pathloss differentials between the UE and each of the one or more radio units in the group.

26. The method of claim 25, wherein determining the composite precoder for the UE using said at least some radio-unit-specific preferred precoder index reports received from the UE and the other information comprises:

using the pathloss differential information to assign respective weights to the respective precoders indicated by said at least some radio-unit-specific preferred precoder index reports received from the UE; and combining the respective precoders indicated by said at least some radio-unit-specific preferred precoder index reports received from the UE using the weights assigned thereto in order to determine the composite precoder for the UE.

27. The method of claim 24, wherein the distributed unit is configured to use other information in addition to at least some radio-unit-specific preferred precoder index reports received from the UE in order to determine the composite precoder for the UE;

wherein the UE for which the composite precoder is determined comprises a first UE;

wherein the composite precoder is used for transmitting to the first UE using a set of physical resource blocks (PRBs); and wherein the other information comprises information about at least some radio-unit-specific preferred precoder index reports received from any other UEs the distributed unit is scheduling for transmission to on at least some of the PRBs included in the set used for transmitting to the first UE.

28. The method of claim 27, wherein determining the composite precoder for the UE using said at least some radio-unit-specific preferred precoder index reports received from the UE and the other information comprises:

using said at least some radio-unit-specific preferred precoder index reports received from the first UE and at least some radio-unit-specific preferred precoder index reports received from said other UEs in order to determine the composite precoder for the first UE.

29. The method of claim 28, wherein using said at least some radio-unit-specific preferred precoder index reports received from the first UE and said at least some radio-unit-specific preferred precoder index reports received from said other UEs in order to determine the composite precoder for the first UE comprises:

applying interference suppression techniques using said at least some radio-unit-specific preferred precoder index reports received from the first UE and said at least some radio-unit-specific preferred precoder index reports received from said other UEs.

30. The method of claim 29, wherein applying the interference suppression techniques comprises:

applying the interference suppression techniques using the respective precoders indicated by said at least some radio-unit-specific preferred precoder index reports received from the first UE and said at least some radio-unit-specific preferred precoder index reports received from said other UEs.

31. The method of claim 17, wherein the composite precoder is used for transmitting to the UE using the one or more radio units included in the group using multiple-input, multiple-output (MIMO) transmission.

32. The method of claim 17, wherein the composite precoder is used for transmitting to the UE using the one or more radio units included in the group using at least one of: co-located MIMO (C-MIMO) transmission and distributed MIMO (D-MIMO) transmission.

* * * * *